(12) United States Patent
Hsu et al.

(10) Patent No.: US 11,587,213 B1
(45) Date of Patent: Feb. 21, 2023

(54) PRESERVING DYNAMIC RANGE IN IMAGES

(71) Applicant: GM CRUISE HOLDINGS LLC, San Francisco, CA (US)

(72) Inventors: Ming-Hsuan Hsu, Milpitas, CA (US); Boyang Zhang, San Jose, CA (US); Shane McGuire, Redwood City, CA (US); Michael Shagam, San Francisco, CA (US)

(73) Assignee: GM Cruise Holdings LLC., San Francisco, CA (US)

( * ) Notice: Subject to any disclaimer, the term of this patent is extended or adjusted under 35 U.S.C. 154(b) by 0 days.

(21) Appl. No.: 17/520,194

(22) Filed: Nov. 5, 2021

(51) Int. Cl.
*G06T 5/00* (2006.01)
*H04N 5/235* (2006.01)

(52) U.S. Cl.
CPC .......... *G06T 5/009* (2013.01); *H04N 5/2355* (2013.01); *G06T 2207/10024* (2013.01); *G06T 2207/20208* (2013.01); *G06T 2207/30252* (2013.01)

(58) Field of Classification Search
CPC .......... G06T 5/009; G06T 2207/10024; G06T 2207/20208; G06T 2207/30252; H04N 5/2355
See application file for complete search history.

(56) References Cited

U.S. PATENT DOCUMENTS

| | | | | |
|---|---|---|---|---|
| 9,024,951 | B2 * | 5/2015 | Frank | G06T 5/009 345/428 |
| 9,679,365 | B2 * | 6/2017 | Zhai | G06T 5/50 |
| 9,883,112 | B1 * | 1/2018 | Igor' Valer'Evich | H04N 5/23245 |
| 10,148,907 | B1 * | 12/2018 | Wu | H04N 5/20 |
| 10,176,561 | B2 * | 1/2019 | Evans | H04N 9/68 |
| 10,805,505 | B2 * | 10/2020 | Kiser | H04N 5/265 |
| 11,263,731 | B2 * | 3/2022 | Thebault | H04N 1/6058 |
| 2012/0206470 | A1 * | 8/2012 | Frank | G06T 5/009 345/581 |
| 2013/0241931 | A1 * | 9/2013 | Mai | H04N 1/646 345/428 |
| 2018/0005357 | A1 * | 1/2018 | Lasserre | G06T 5/009 |
| 2018/0027252 | A1 * | 1/2018 | Lasserre | H04N 19/126 382/233 |
| 2018/0068427 | A1 * | 3/2018 | Rotte | G09G 5/10 |
| 2018/0152684 | A1 * | 5/2018 | Wozniak | H04N 5/20 |
| 2018/0352257 | A1 * | 12/2018 | Leleannec | G06T 5/10 |
| 2019/0149792 | A1 * | 5/2019 | Luo | H04N 9/76 348/571 |
| 2019/0171853 | A1 * | 6/2019 | Gao | G06K 7/146 |
| 2019/0246087 | A1 * | 8/2019 | Uesaka | H04N 5/772 |
| 2019/0373260 | A1 * | 12/2019 | Kiser | H04N 5/2258 |
| 2020/0358993 | A1 * | 11/2020 | Andrivon | H04N 9/64 |

(Continued)

*Primary Examiner* — Brian P Yenke
(74) *Attorney, Agent, or Firm* — Polsinelli PC

(57) ABSTRACT

Methods and systems are provided for preserving dynamic range in images. In some aspects, a process can include steps for receiving, at an autonomous vehicle system, image data from an image sensor, generating, by the autonomous vehicle system, a high dynamic range (HDR) output by performing HDR processing on the image data from the image sensor, generating, by the autonomous vehicle system, a least significant bit (LSB) output by performing LSB processing on the image data from the image sensor, and generating, by the autonomous vehicle system, an 8-bit output by performing a buffer process on the HDR output and the LSB output of the image sensor.

20 Claims, 8 Drawing Sheets

(56) References Cited

U.S. PATENT DOCUMENTS

| | | | |
|---|---|---|---|
| 2020/0380646 A1* | 12/2020 | Viti | G06T 5/007 |
| 2020/0394775 A1* | 12/2020 | Andrivon | H04N 19/70 |
| 2021/0266608 A1* | 8/2021 | Adrivon | H04N 19/98 |
| 2022/0132016 A1* | 4/2022 | Wang | G06T 5/009 |
| 2022/0198622 A1* | 6/2022 | Kumar | G06T 5/009 |

* cited by examiner

PRESERVING DYNAMIC RANGE IN IMAGES

BACKGROUND

1. Technical Field

The subject technology provides solutions for autonomous vehicle systems, and in particular, for mapping or automated surveying by preserving dynamic range in images.

2. Introduction

Autonomous vehicles are vehicles having computers and control systems that perform driving and navigation tasks that are conventionally performed by a human driver. As autonomous vehicle technologies continue to advance, ride-sharing services will increasingly utilize autonomous vehicles to improve service efficiency and safety. However, autonomous vehicles will be required to perform many of the functions that are conventionally performed by human drivers, such as avoiding dangerous or difficult routes, and performing other navigation and routing tasks necessary to provide safe and efficient transportation. Such tasks may require the collection and processing of large quantities of data disposed on the autonomous vehicle.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Figure 1:
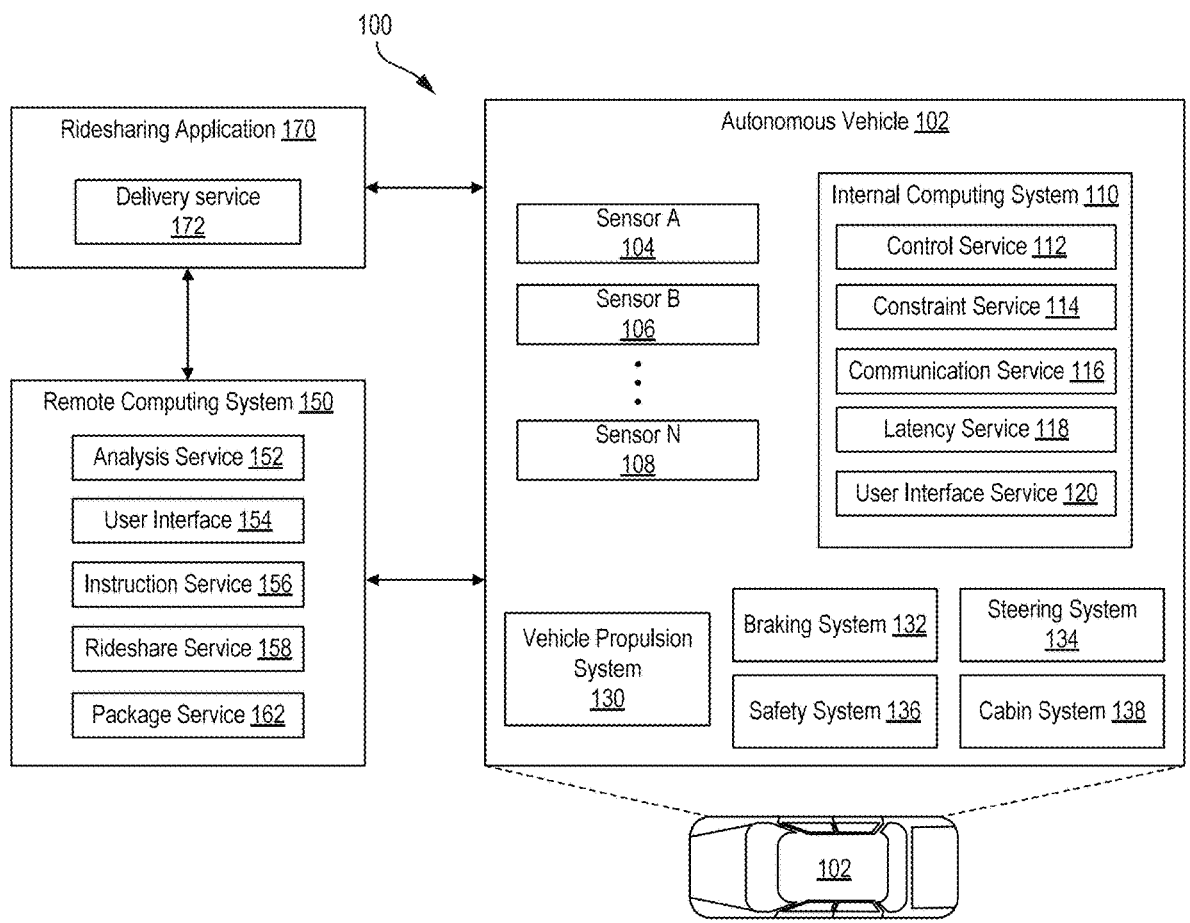
FIG. 1 illustrates an example system environment that can be used to facilitate autonomous vehicle navigation and routing operations, according to some aspects of the disclosed technology.

FIG. 1 illustrates an example system environment 100 that can be used to facilitate AV dispatch and operations, according to some aspects of the disclosed technology. Autonomous vehicle 102 can navigate about roadways without a human driver based upon sensor signals output by sensor systems 104-106 of autonomous vehicle 102. Autonomous vehicle 102 includes a plurality of sensor systems 104-106 (a first sensor system 104 through an Nth sensor system 106). Sensor systems 104-106 are of different types and are arranged about the autonomous vehicle 102. For example, first sensor system 104 may be a camera sensor system and the Nth sensor system 106 may be a Light Detection and Ranging (LIDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 180 are illustrated coupled to the autonomous vehicle 102, it is understood that more or fewer sensors may be coupled to the autonomous vehicle 102.

Autonomous vehicle 102 further includes several mechanical systems that are used to effectuate appropriate motion of the autonomous vehicle 102. For instance, the mechanical systems can include but are not limited to, vehicle propulsion system 130, braking system 132, and steering system 134. Vehicle propulsion system 130 may include an electric motor, an internal combustion engine, or both. The braking system 132 can include an engine brake, brake pads, actuators, and/or any other suitable componentry that is configured to assist in decelerating autonomous vehicle 102. In some cases, braking system 132 may charge a battery of the vehicle through regenerative braking. Steering system 134 includes suitable componentry that is configured to control the direction of movement of the autonomous vehicle 102 during navigation.

Autonomous vehicle 102 further includes a safety system 136 that can include various lights and signal indicators, parking brake, airbags, etc. Autonomous vehicle 102 further includes a cabin system 138 that can include cabin temperature control systems, in-cabin entertainment systems, etc.

Autonomous vehicle 102 additionally comprises an internal computing system 110 that is in communication with sensor systems 180 and systems 130, 132, 134, 136, and 138. Internal computing system 110 includes at least one processor and at least one memory having computer-executable instructions that are executed by the processor. The computer-executable instructions can make up one or more services responsible for controlling autonomous vehicle 102, communicating with remote computing system 150, receiving inputs from passengers or human co-pilots, logging metrics regarding data collected by sensor systems 180 and human co-pilots, etc.

Internal computing system 110 can include a control service 112 that is configured to control operation of vehicle propulsion system 130, braking system 132, steering system 134, safety system 136, and cabin system 138. Control service 112 receives sensor signals from sensor systems 180 as well communicates with other services of internal computing system 110 to effectuate operation of autonomous vehicle 102. In some embodiments, control service 112 may carry out operations in concert one or more other systems of autonomous vehicle 102.

Internal computing system 110 can also include constraint service 114 to facilitate safe propulsion of autonomous vehicle 102. Constraint service 116 includes instructions for activating a constraint based on a rule-based restriction upon operation of autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of control service 112.

The internal computing system 110 can also include communication service 116. The communication service 116 can include both software and hardware elements for transmitting and receiving signals from/to the remote computing system 150. Communication service 116 is configured to transmit information wirelessly over a network, for example, through an antenna array that provides connectivity using one or more cellular transmission standards, such as long-term evolution (LTE), 3G, 5G, or the like.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, ridesharing pickup and drop off instructions etc.

Internal computing system 110 can also include latency service 118. Latency service 118 can utilize timestamps on communications to and from remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, latency service 118 can enable other systems of autonomous vehicle 102 or a passenger to make necessary decisions or to provide the needed feedback.

Internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 140 regarding reporting data for training and evaluating machine learning algorithms, requesting assistance from remote computing system 150 or a human operator via the remote computing system 150, software service updates, rideshare pickup and drop off instructions, etc.

Remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

Remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

Remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

Remote computing system 150 can also include rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc.

Traditionally, camera dynamic range requirements are high as they need to cover many low light scenes while preserving traffic light or other high intensity light sources that are embedded within. The dynamic range performance of commercial off-the-shelf (COTS) image sensors are marginal at best for single cameras. Moreover, the nonlinear processing in image signal processing (ISP) can further reduce the dynamic range. Multiple cameras are also used to compensate for the dynamic range shortage. In this example, different cameras are used to watch different signal ranges. Conventional cameras also have a hard time showing detail in lowlight areas at the same time as the details of bright sources such as traffic lights. A tradeoff must be made, and if the camera settings are optimized for the low light, the traffic light content will saturate, thereby producing incorrect colors. To combat this, multiple cameras can be utilized that are tuned to specifically preserve details within areas of a scene with different brightnesses (e.g., radiances).

As such, a need exists to provide a signal processing method and system to extract high intensity signals (e.g., preserve the upper dynamic range) along with a tone compressed High Dynamic Range (HDR) output to preserve the dynamic range.

In some implementations, the present disclosure addresses the dynamic range issues as described above by utilizing a signal processing method instead of using multiple cameras. Moreover, the systems and methods as described herein can provide a dual data processing (e.g., HDR and 8-bit most significant bit (MSB)) based on raw input data for each frame, and a linear process for the 8-bit MSB to preserve high intensity signals. In some implementations, the systems and methods as described herein can include processing an HDR image twice: 1) as a tone mapped HDR image; and 2) as an 8-bit linear MSB of an original sensor output.

Figure 2:
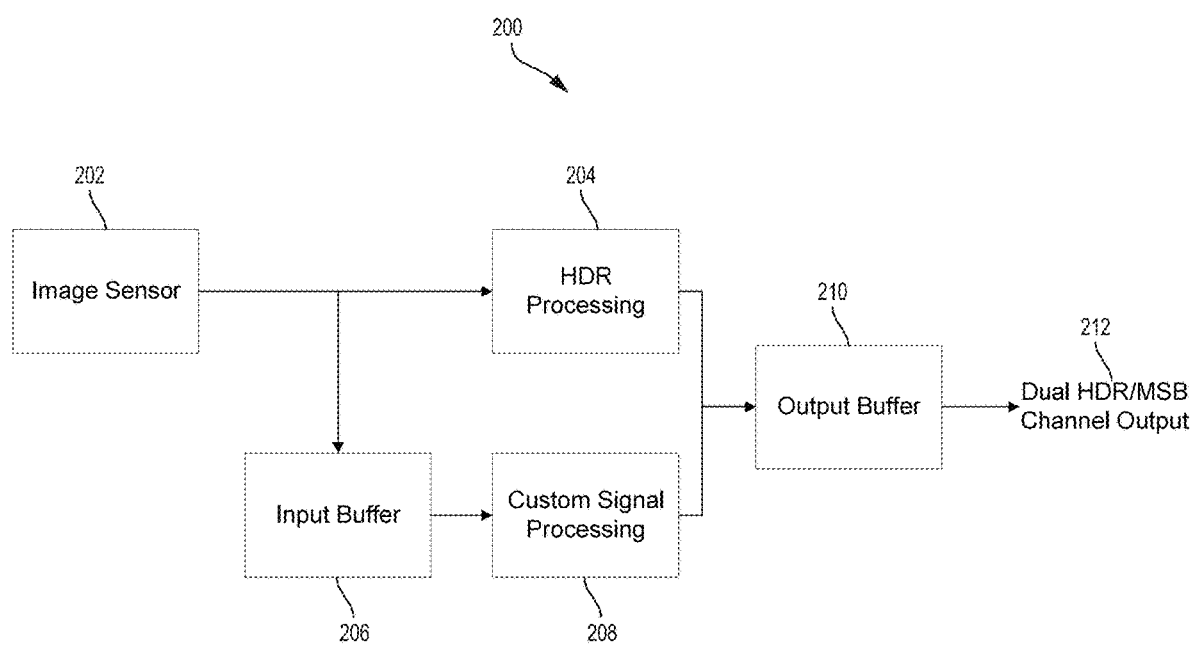
FIG. 2 illustrates an example process of generating a dual channel HDR and MSB output, according to some aspects of the disclosed technology.

FIG. 2 illustrates an example process of generating a dual channel HDR and MSB output 200, according to some aspects of the disclosed technology. In some implementations, the process 200 can include receiving image data from a camera 202. The process 200 can further include performing HDR processing on the image data 204 as received from step 202. The process 200 can also include buffering the image data 206 received from step 202 with an input buffer.

In other implementations, if there are sufficient process bandwidth in the image signal processing (ISP)/camera system as described herein, the data from the image sensor 202 can be processed in parallel without buffering the data from the image sensor 202. In some examples, the data from the image sensor 202 can be processed in an alternating manner (e.g., row by row). In other examples, the image sensor 202 can provide data row by row to the ISP. For example, instead of buffering the whole frame data, the ISP system can process one row of data using an HDR pipeline and then switch to an 8-bit MSB pipeline in an alternating manner, as described herein. In other examples, the ISP system as described herein can buffer the whole frame data and wait for the HDR process to be completed prior to switching to the 8-bit MSB pipeline.

The process 200 can further include performing custom 8-bit MSB signal processing on the data 208 received from step 206. The process 200 can additionally include buffering the data 210 received from steps 204, 208 with an output buffer. The process 200 can also include outputting a processed dual channel HDR and MSB output 212.

Dual Channel Output:

Real world dynamic range may be larger than that of commercially available image sensors. For example, camera systems utilize two different cameras to solve this issue. In some examples, a bright object (e.g., a person wearing white clothing) under direct sunlight may have a high illumination rating, whereas an adjacent object (e.g., a person in dark clothing) in a dark tunnel or shadow may have a low illumination rating. Scenarios are more troubling at night where the pedestrian may be wearing dark clothing and standing next to a bright traffic signal with a high illumination rating. A traditional camera control and process technology (e.g., an image sensor) will have a difficult time properly capturing these scenarios without the aid of a separate camera.

The present disclosure (e.g., process 200) can utilize a single camera to reduce costs and complexity. Moreover, process 200 can eliminate additional gain stages in image signal processing (ISP) by utilizing a dual channel output. Raw input data (e.g., from step 202) can be processed through an ISP pipeline twice by using different sets of process parameters, as further described below in FIGS. 5 and 6. For example, the output from the second channel can be an unprocessed 8-bit most significant bit (MSB) data.

Figure 3:
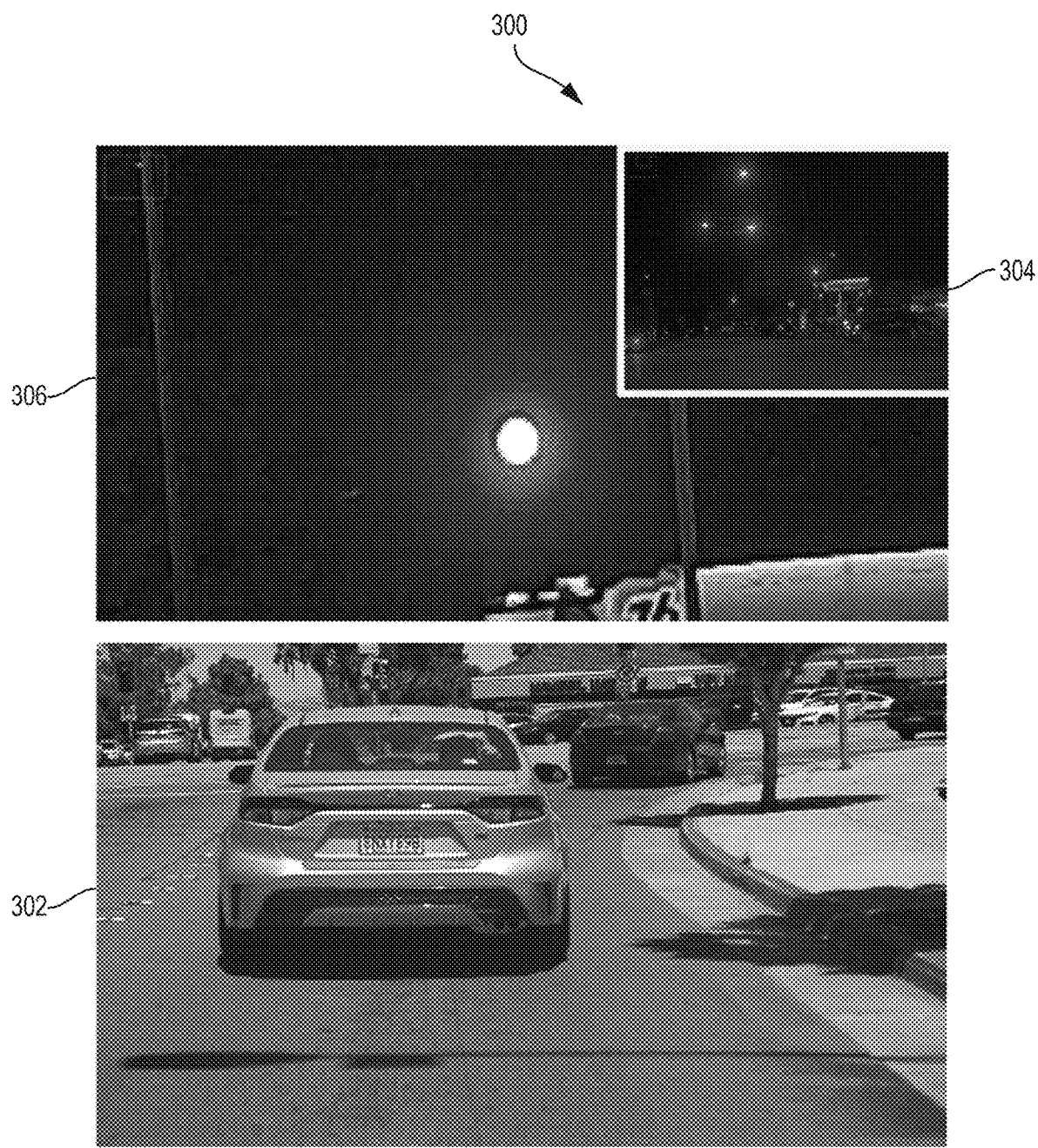
FIG. 3 illustrates an example HDR output of the process of FIG. 2, according to some aspects of the disclosed technology.

FIG. 3 illustrates an example HDR output 300 of the process of FIG. 2, according to some aspects of the disclosed technology. In some implementations, the HDR output 300 (e.g., from process 200 of FIG. 2) is illustrated in FIG. 3. For example, HDR output 300 can include an HDR image 302, along with a view of a scene 304 and an enlarged view of the scene 306 of one of the traffic lights. In some examples, image 302 can be an HDR output during daytime conditions. Image 304 can be an HDR output during nighttime conditions. Image 306 can be a zoomed-in image of image 304 to show the traffic light in greater detail.

Figure 4:
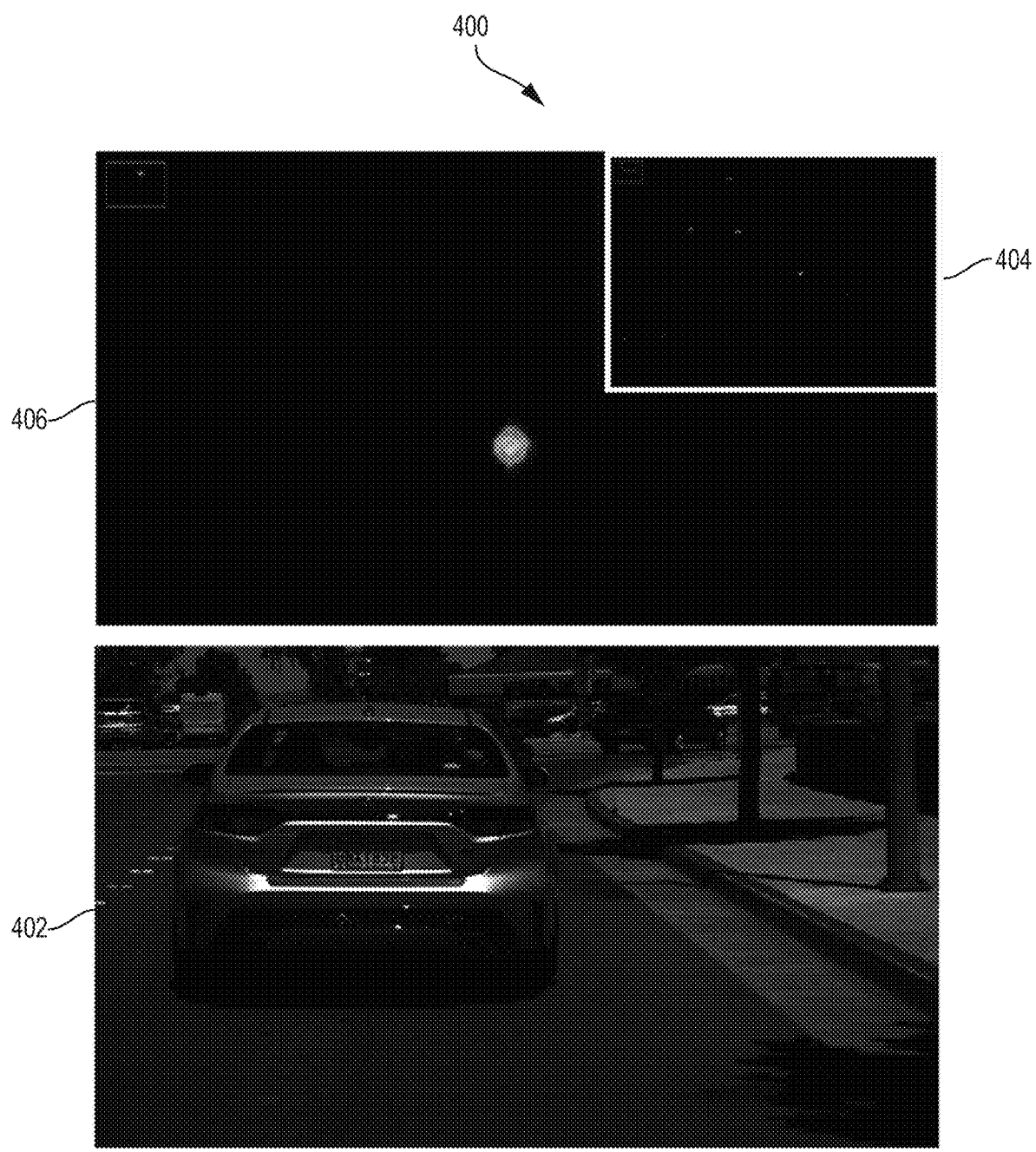
FIG. 4 illustrates an example most significant bit (MSB) output of the process of FIG. 2, according to some aspects of the disclosed technology.

FIG. 4 illustrates an example most significant bit (MSB) output of the process of FIG. 2, according to some aspects of the disclosed technology. In some implementations, the MSB output 400 (e.g., from process 200 of FIG. 2) is illustrated in FIG. 4. For example, MSB output 400 can include a MSB image 402, along with a view of a scene 404 and an enlarged view of the scene 406 of one of the traffic lights. In some images, image 402 can be an 8-bit MSB output under daytime conditions. Image 402 can appear to be darker than the HDR output of FIG. 3 since the least significant bit (LSB) data is truncated. Image 404 can also be an 8-bit MSB output during nighttime conditions. Image 406 can be a zoomed-in image of image 404 to show the traffic light in greater detail. In some examples, no traffic light saturation is observed.

Figure 5:
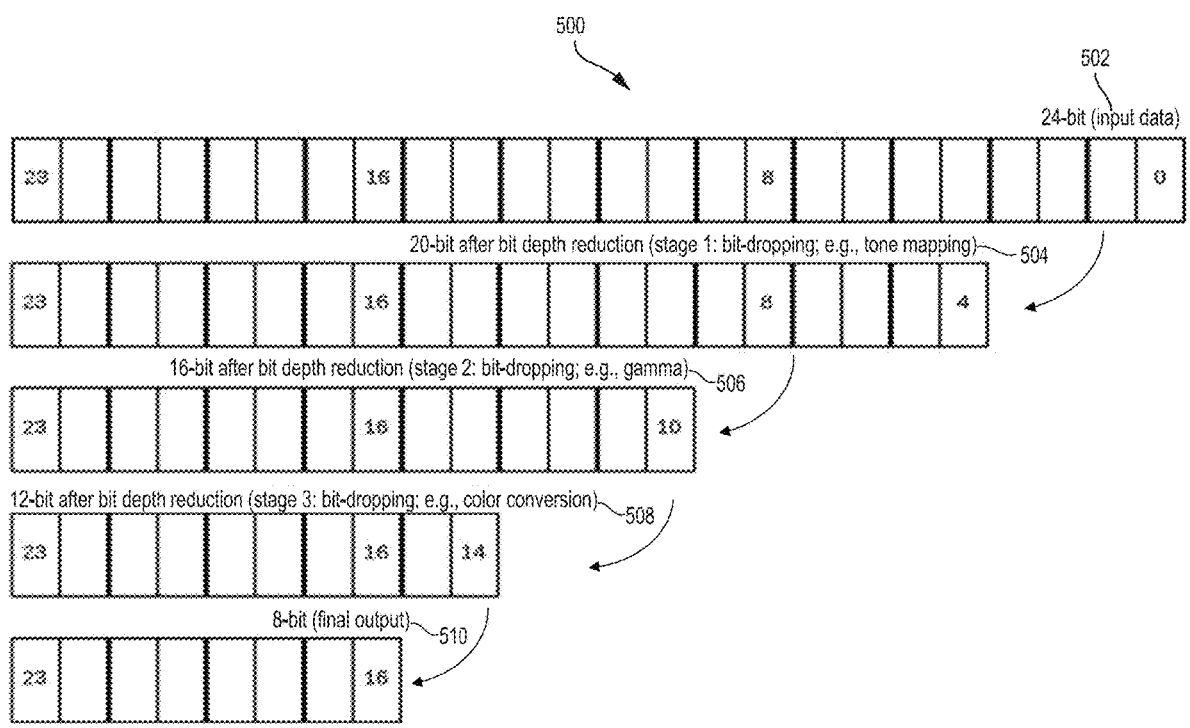
FIG. 5 illustrates an example process of generating an 8-bit MSB output, according to some aspects of the disclosed technology.

FIG. 5 illustrates an example process of generating an 8-bit most significant bit (MSB) output 500, according to some aspects of the disclosed technology.

In some implementations, an image from an image sensor can be processed twice through an image signal processing (ISP) pipeline. For example, an HDR process can be utilized to generate an HDR image output (e.g., step 204 of FIG. 2). Additionally, a process of cropping the top 8-bit most significant bit (MSB) data from a 24-bit input data can be utilized to generate an 8-bit MSB output. In some examples, the second process can eliminate tone compression issues (e.g., from 24-bit to 8-bit) by cropping the 8-bit MSB data. Moreover, the linear processes (e.g., process 500, 600) utilized for the 8-bit MSB can avoid additional gain stages in the ISP. By adding those up, high intensity signals can be preserved and saturation can be avoided by using the single camera solution as described herein.

8-Bit MSB Process in Dual Channel Output Mode:

In some implementations, the process 500 can generate an 8-bit MSB output in a dual channel output mode by utilizing various stages of bit-dropping and bit-cropping. For example, the process 500 can include receiving 24-bit decompanded raw image data 502. The process 500 can also include various stages of bit-dropping such as a bit-dropping stage 1 504, a bit-cropping stage 2 506, and a bit-cropping stage 3 508. By utilizing these stages 504, 506, 508, the process 500 can reduce a bit depth of an input bit depth (e.g., 24-bit data 502) to an output bit depth (e.g., 8-bit data 510). Each of the stages 504, 506, 508 can also remove least significant bits (LSBs) if there is bit depth reducing to be performed in a particular stage. Reducing a bit depth in a single stage may result in artifacts. In some examples, the process 500 can reduce bit depth gradually over multiple stages 504, 506, 508 (e.g., stages 1-3) to reduce the number of artifacts. In another example, the process 500 can reduce the bit depth at each stage 504, 506, 508 (e.g., stages 1-3) as in the following: a) 24-bit (e.g., input data); b) 20-bit (e.g., bit-cropping stage 1 504); c) 16-bit (e.g., bit-cropping stage 2 506); d) 12-bit (e.g., bit-cropping stage 3 508); and e) 8-bit (e.g., output 510).

In other implementations, the ISP system as described herein can utilize different data/bit width for each stage. For example, the pipeline and functional blocks of the ISP system can be different (e.g., sequence of the pipelines, functions of each block, algorithms utilized, etc.).

Figure 6:
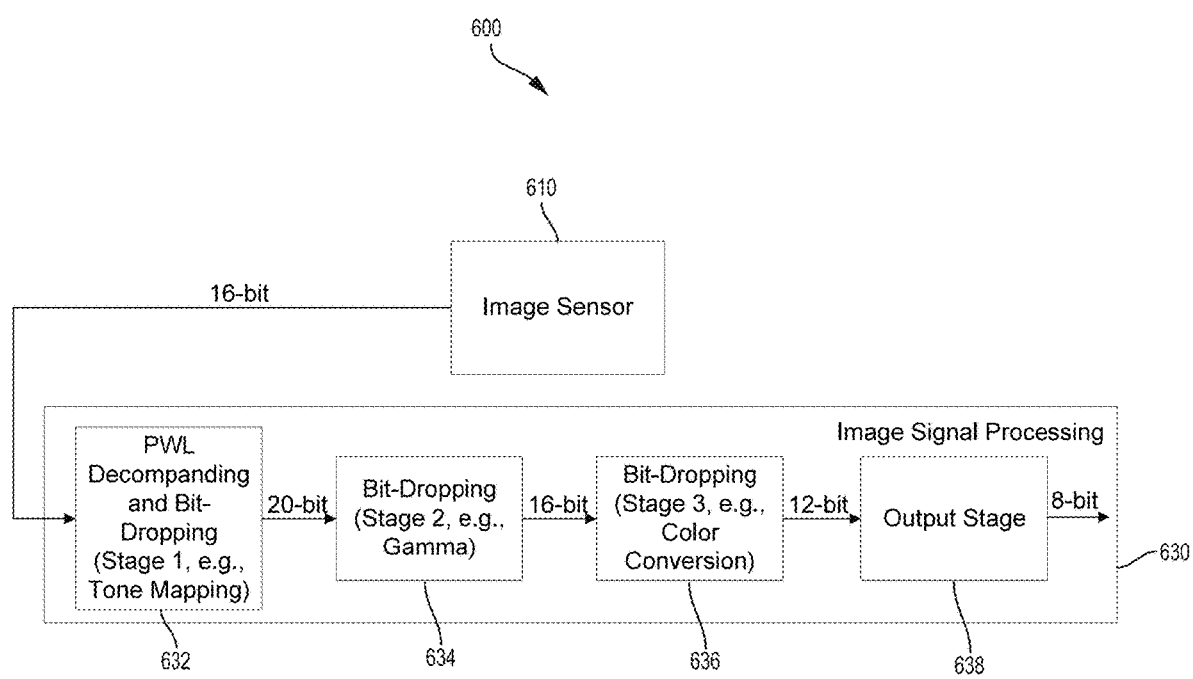
FIG. 6 illustrates an example process of a dual channel output mode, according to some aspects of the disclosed technology.

FIG. 6 illustrates an example process of a dual channel output mode 600, according to some aspects of the disclosed technology. In some implementations, the process 600 can include utilizing an image sensor 610 and image signal processing (ISP) 630. For example, the image sensor 610 can output 16-bit data. The image sensor 610 can also include generating pre-blended HDR images 1, 2, 3, ... n.

In other implementations, the ISP 630 can include receiving the 16-bit data from the image sensor 610. At step 632, the ISP 630 can further include utilizing PWL decompanding and bit-dropping such as tone mapping (e.g., stage 1 504 of FIG. 5) on the 16-bit data received from the image sensor 610 to generate 20-bit data. At step 634, the ISP 630 can include performing bit-dropping such as gamma (e.g., stage 2 506 of FIG. 5) on the 20-bit data of step 632, thereby generating 16-bit data. At step 636, the ISP 630 can include performing bit-dropping such as color conversion (e.g., stage 3 508 of FIG. 5) on the 16-bit data received from step 634 to generate 12-bit data. At step 638, the ISP 630 can include an output stage on the 12-bit data received from step 636 to generate 8-bit data.

In some implementations, a final output can include an HDR image with "preblended" images being "brackets" to highlight certain brightnesses in a scene given the limited dynamic range that is available. The LSB output can crop and retain the top 8 LSBs of a pixel depth, and produce an image that is substantially equivalent to a "low sensitivity" bracket.

The systems and methods as described herein can provide a dual data processing (e.g., HDR and 8-bit most significant bit (MSB)) based on raw input data for each frame, and a linear process for the 8-bit MSB to preserve high intensity signals (e.g., as described in FIGS. 5 and 6).

In other examples, the present disclosure can include utilizing an image sensor that has a super wide dynamic range (e.g., >140 dB) without major artifacts. In some examples, HDR blending of "bracketed" images can result in artifacts that can be detrimental to the ability to preserve the rendering of the image quality. The 8-bit MSB approach as described herein can avoid the HDR pipeline and can be used for situations where the color/fidelity of bright objects must be preserved.

Figure 7:
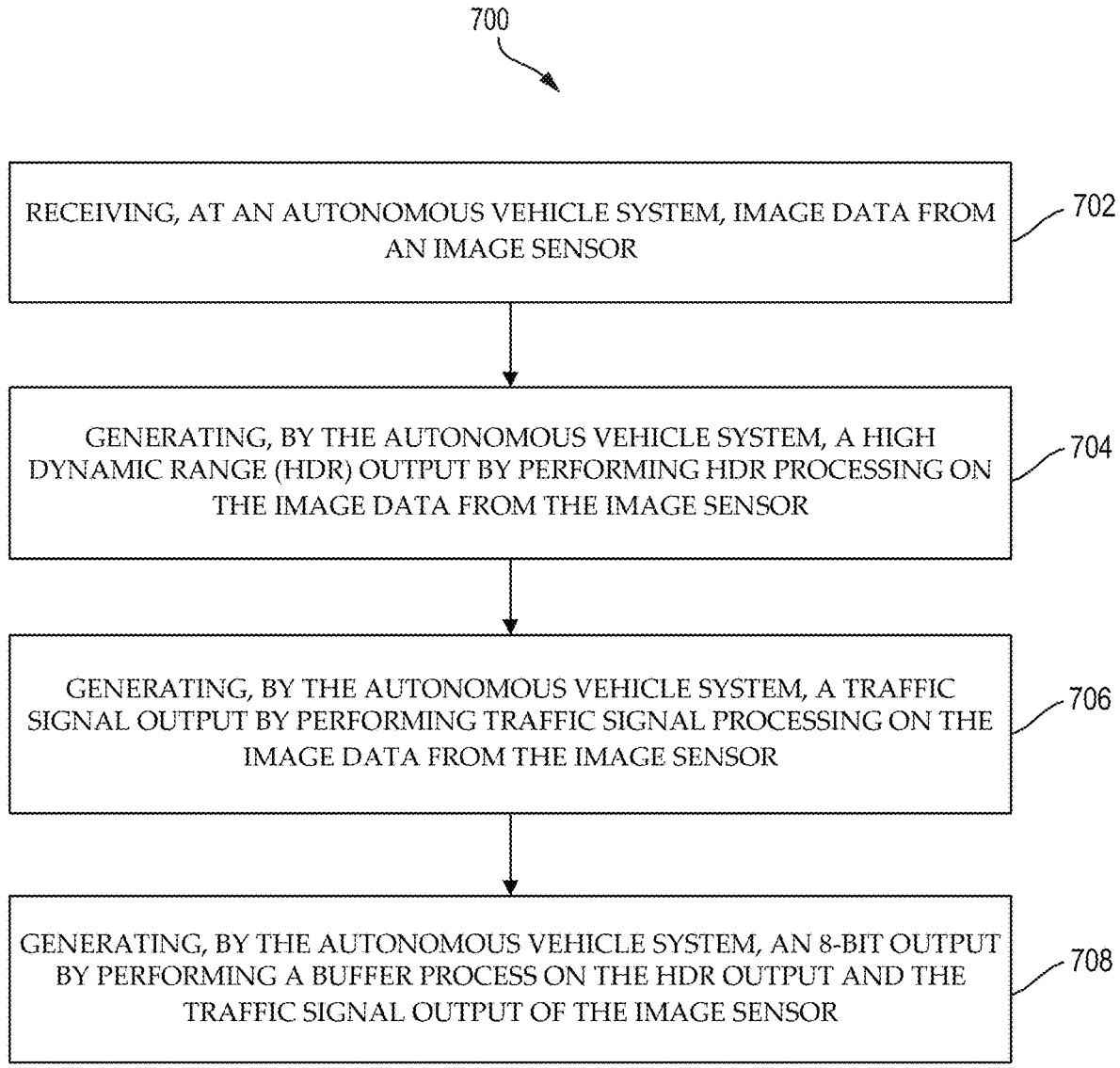
FIG. 7 illustrates an example process of preserving dynamic range in images, according to some aspects of the disclosed technology.

Having disclosed some example system components and concepts, the disclosure now turns to FIG. 7, which illustrates an example method 700 for mapping or automated surveying by preserving dynamic range in images. The steps outlined herein are exemplary and can be implemented in any combination thereof, including combinations that exclude, add, or modify certain steps.

At step 702, method 700 can include receiving, at an autonomous vehicle system, image data from an image sensor.

At step 704, method 700 can include generating, by the autonomous vehicle system, a high dynamic range (HDR) output by performing HDR processing on the image data from the image sensor.

At step 706, method 700 can include generating, by the autonomous vehicle system, a least significant bit (LSB) output by performing LSB processing on the image data from the image sensor. The LSB processing on the image data from the image sensor can include performing at least one of piecewise linear ("PWL") decompanding and a first bit-dropping stage on the image data from the image sensor. The LSB processing on the image data from the image sensor can include performing tone mapping on the image data from the image sensor. The LSB processing on the image data from the image sensor can include performing a gamma process on the image data from the image sensor. The LSB processing on the image data from the image sensor can include performing color space conversion on the image data from the image sensor. The LSB processing on the image data from the image sensor can include a second bit-dropping stage on the image data from the image sensor to generate the 8-bit output.

At step 708, method 700 can include generating, by the autonomous vehicle system, an 8-bit output by performing a buffer process on the HDR output and the LSB output of the image sensor. The 8-bit output can be an 8-bit most significant bit (MSB).

Figure 8:
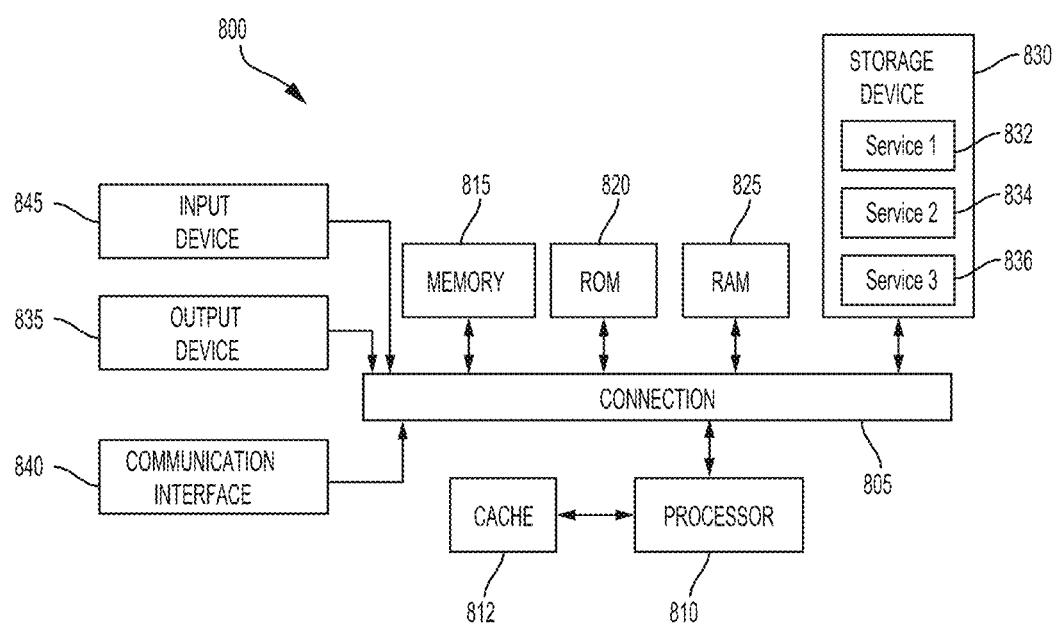
FIG. 8 illustrates an example processor-based system with which some aspects of the subject technology can be implemented.

FIG. 8 illustrates an example processor-based system with which some aspects of the subject technology can be implemented. For example, processor-based system 800 that can be any computing device making up internal computing system 110, remote computing system 150, a passenger device executing the rideshare app 170, internal computing device 130, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read-only memory (ROM) 820 and random-access memory (RAM) 825 to processor 810. Computing system 800 can include a cache of high-speed memory 812 connected directly with, in close proximity to, and/or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB)

port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

Storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. By way of example computer-executable instructions can be used to implement perception system functionality for determining when sensor cleaning operations are needed or should begin. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method for preserving dynamic range in images, the computer-implemented method comprising:
   receiving, at an autonomous vehicle system associated with an autonomous vehicle navigating a route, image data from an image sensor about an environment of the autonomous vehicle;
   generating, by the autonomous vehicle system, a dual channel HDR and most significant bit (MSB) output to prevent light saturated signals in the image data capturing a low light environment by:
   generating a high dynamic range (HDR) output by performing HDR processing on the image data from the image sensor;
   generating, by the autonomous vehicle system, a least significant bit (LSB) output by performing LSB processing on the image data from the image sensor; and
   generating, by the autonomous vehicle system, an 8-bit MSB output that removes light saturation within the image data of the low light environment while preserving the dynamic range of HDR and LSB processing by performing an alternating buffer process on the HDR output and the LSB output of the image sensor.

2. The computer-implemented method of claim 1, wherein the LSB processing on the image data from the image sensor includes performing at least one of piecewise linear ("PWL") decompanding and a first bit-dropping stage on the image data from the image sensor.

3. The computer-implemented method of claim 1, wherein the LSB processing on the image data from the image sensor includes performing tone mapping on the image data from the image sensor.

4. The computer-implemented method of claim 1, wherein the LSB processing on the image data from the image sensor includes performing a gamma process on the image data from the image sensor.

5. The computer-implemented method of claim 1, wherein the LSB processing on the image data from the image sensor includes performing color space conversion on the image data from the image sensor.

6. The computer-implemented method of claim 1, wherein the LSB processing on the image data from the image sensor includes a second bit-dropping stage on the image data from the image sensor to generate the 8-bit output.

7. The computer-implemented method of claim 1, wherein the 8-bit output is an 8-bit most significant bit (MSB).

8. A system for preserving dynamic range in images, the system comprising:
   one or more processors; and
   at least one computer-readable storage medium having stored therein instructions which, when executed by the one or more processors, cause the system to:
   receive, as an autonomous vehicle navigates a route, image data from an image sensor about an environment of the autonomous vehicle; and
   generate a dual channel HDR and most significant bit (MSB) output to prevent light saturated signals in the image data capturing a low light environment by causing the system to:
   generate a high dynamic range (HDR) output by performing HDR processing on the image data from the image sensor;
   generate a least significant bit (LSB) output by performing LSB processing on the image data from the image sensor; and
   generate an 8-bit MSB output that removes light saturation within the image data of the low light environment while preserving the dynamic range of HDR and LSB processing by performing an alternating buffer process on the HDR output and the LSB output of the image sensor.

9. The system of claim 8, wherein the LSB processing on the image data from the image sensor includes performing at least one of piecewise linear ("PWL") decompanding and a first bit-dropping stage on the image data from the image sensor.

10. The system of claim 8, wherein the LSB processing on the image data from the image sensor includes performing tone mapping on the image data from the image sensor.

11. The system of claim 8, wherein the LSB processing on the image data from the image sensor includes performing a gamma process on the image data from the image sensor.

12. The system of claim 8, wherein the LSB processing on the image data from the image sensor includes performing color space conversion on the image data from the image sensor.

13. The system of claim 8, wherein the LSB processing on the image data from the image sensor includes a second bit-dropping stage on the image data from the image sensor to generate the 8-bit output.

14. The system of claim 8, wherein the 8-bit output is an 8-bit most significant bit (MSB).

15. A non-transitory computer-readable storage medium comprising:
   instructions stored on the non-transitory computer-readable storage medium, the instructions, when executed by one more processors, cause the one or more processors to:
   receive, as an autonomous vehicle navigates a route, image data from an image sensor about an environment of the autonomous vehicle;
   generate a dual channel HDR and most significant bit (MSB) output to prevent light saturated signals in the image data capturing a low light environment by causing the one or more processors to:
generate a high dynamic range (HDR) output by performing HDR processing on the image data from the image sensor;
generate a least significant bit (LSB) output by performing LSB processing on the image data from the image sensor; and
generate an 8-bit MSB output that removes light saturation within the image data of the low light environment while preserving the dynamic range of HDR and LSB processing by performing an alternating buffer process on the HDR output and the LSB output of the image sensor.

16. The non-transitory computer-readable storage medium of claim 15, wherein the LSB processing on the image data from the image sensor includes performing at least one of piecewise linear ("PWL") decompanding and a first bit-dropping stage on the image data from the image sensor.

17. The non-transitory computer-readable storage medium of claim 15, wherein the LSB processing on the image data from the image sensor includes performing tone mapping on the image data from the image sensor.

18. The non-transitory computer-readable storage medium of claim 15, wherein the LSB processing on the image data from the image sensor includes performing a gamma process on the image data from the image sensor.

19. The non-transitory computer-readable storage medium of claim 15, wherein the LSB processing on the image data from the image sensor includes performing color space conversion on the image data from the image sensor.

20. The non-transitory computer-readable storage medium of claim 15, wherein the LSB processing on the image data from the image sensor includes a second bit-dropping stage on the image data from the image sensor to generate the 8-bit MSB output.

* * * * *